US011981864B1

(12) United States Patent
Dawara et al.

(10) Patent No.: US 11,981,864 B1
(45) Date of Patent: May 14, 2024

(54) TEMPORARY ISOLATION SYSTEM FOR RESERVOIRS

(71) Applicant: Baker Hughes Oilfield Operations LLC, Houston, TX (US)

(72) Inventors: Mohamed Dawara, Tomball, TX (US); Robert Comer, Tomball, TX (US); Julio R. Gomez, Cypress, TX (US); Naima Bestaoui-Spurr, The Woodlands, TX (US); Kimberly Spurlock-Lant, The Woodlands, TX (US); Ahmed Shehata, Houston, TX (US); Camilo Andres Franco Ariza, Medelin.Antioquia (CO); Samira Heidari, Shiraz (IR); Farid Bernardo Cortes Correa, Medelin.Antioquia (CO)

(73) Assignee: Baker Hughes Oilfield Operations LLC, Houston, TX (US)

(*) Notice: Subject to any disclaimer, the term of this patent is extended or adjusted under 35 U.S.C. 154(b) by 0 days.

(21) Appl. No.: 18/112,895

(22) Filed: Feb. 22, 2023

(51) Int. Cl.
*C09K 8/68* (2006.01)
*C09K 8/70* (2006.01)

(52) U.S. Cl.
CPC .............. *C09K 8/706* (2013.01); *C09K 8/685* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 8,418,762 B2 | 4/2013 | Casey et al. | |
| 8,636,066 B2 | 1/2014 | Gupta et al. | |
| 9,868,892 B2 | 1/2018 | Dajani et al. | |
| 9,920,609 B2 | 3/2018 | Gupta | |
| 10,989,011 B2 | 4/2021 | Gupta | |
| 2009/0149354 A1 | 6/2009 | Dajani et al. | |
| 2013/0306317 A1* | 11/2013 | Karadkar | C09K 8/514 166/305.1 |
| 2014/0221256 A1* | 8/2014 | Holtsclaw | C09K 8/86 507/225 |
| 2017/0369766 A1* | 12/2017 | Johnson | C09K 8/508 |
| 2020/0140748 A1* | 5/2020 | Southwell | C09K 8/58 |

OTHER PUBLICATIONS

"High-Pressure, High Temperature Technologies"; Schlumberger; Oilfield Review; Aug. 2008, p. 46-60. (Year: 2008).*
SDS Flopaam (TM) 3230 S, SNF Inc., 10 pp., Oct. 13, 2022.
"Flopaam (TM) for Enhanced Oil Recovery", SNF/Floerger, 12 pp., 2021.

* cited by examiner

*Primary Examiner* — Andrew Sue-Ako
(74) *Attorney, Agent, or Firm* — John Wilson Jones; Jones Delflache LLP

(57) ABSTRACT

An aqueous fluid is gelled in a productive zone of a subterranean formation to create a temporary fluid-impermeable barrier. The fluid contains nanoparticles, a polyacrylamide having a weight average molecular weight from about 1.5 million to 22 million Dalton and an encapsulated liquid crosslinking agent. Upon release of the liquid crosslinking agent, the barrier is formed by crosslinking the polyacrylamide. The nanoparticles remain dispersed in the crosslinked gel. The fluid-impermeable barrier is effective over a period of at least 1 hour up to 2 weeks while the downhole temperature in the well is at least 300° C.

21 Claims, 5 Drawing Sheets

US 11,981,864 B1

TEMPORARY ISOLATION SYSTEM FOR RESERVOIRS

FIELD

The disclosure relates to a fluid for temporarily isolating productive zones in an oil, gas or geothermal well by creating a temporary seal or plug when the fluid is gelled in-situ. The temporary seal or plug renders an impermeable barrier to flow of subsequently pumped fluids into the well. The barrier is stable up to temperatures in excess of 300° C.

BACKGROUND

Well stimulation typically focuses on the improvement in production of fluids from the well. Examples of stimulations include hydraulic fracturing, acid stimulation, steam injection, thermal injection and other operations that include injection of fluids and/or heat into a formation. Fluids produced during such operations may be recovered from a multiplicity of producing zones within the reservoir. Such zones typically exhibit varying levels of permeability. At times, it is desirable to seal off a zone of higher permeability in order to produce fluids from a plugged-off zone or lower permeability zone within the reservoir. Further, it may be desirable to temporarily isolate a targeted zone in order to produce fluids from that targeted zone. Such methods of selective stimulation become more important as the life of the well declines and productivity of the well decreases.

Conventionally, selective stimulation of a targeted zone within a formation required the use of a perforating gun wherein the gun was conveyed on a wireline or tubing into the well and positioned adjacent the targeted zone. The gun was then fired to perforate the targeted zone. Fracturing fluid was pumped into the targeted zone under pressure exceeding the pressure at which the targeted zone(s) would fracture. A mechanical device, such as a straddle packer, or plug or sand fill was set in the well between the zone just fractured and a non-stimulated zone to isolate the stimulated zone. The gun was then repositioned by the wireline to another zone or formation and the zone or formation of interest was then selectively perforated. This procedure was repeated until all zones of interest were perforated. Once the completion operation was finished, each plug had to be drilled out of or otherwise removed from the well to permit fluid to be produced to the surface through the well. The process was time consuming and expensive.

More recently, selective isolation of targeted productive intervals within the well have been effectuated by the use of gels capable of temporarily sealing a zone of interest from other zones. For instance, U.S. Pat. No. 8,636,066 discloses use of a borated galactomannan gum as a temporary sealant.

In addition, diverting chemical systems have been developed which provide a temporary barrier for entry of treatment fluids into zones of higher permeability. Such systems enable production from less permeability zones by diverting flow from a blocked higher permeability zone to a zone of lower permeability. See, for instance, U.S. Pat. Nos. 9,919, 966; 9,920,610; 10,041,327; and 10,988,678.

Gellant systems for use in zonal isolation and as diverting agents often exhibit multiple drawbacks. For instance, the temporary plugs are only effective over a relatively short period of time. Further, such systems are ineffective in sealing productive zones at elevated bottomhole temperatures. This is particularly the case in the harvesting or recovery of thermal energy from a thermally productive formation. In such processes, the aqueous based system is pumped deep into a geothermal well of characteristically high temperature where usable energy is extracted and removed. The recovered heat energy may be used to drive turbines as well as generate electrical power through the conversion to heat or electricity. One of the key points in geothermal energy production is managing the thermal losses within the well while heat is mined with the pumped aqueous fluids used as capture and transport medium. Recovery of heat from the geothermal well may be maximized by targeting more productive zones by sealing off less productive zones. However, temporary seals for this purpose must be capable of withstanding the high temperatures encountered in the geothermal well.

Alternative fluids and systems have therefore been sought.

It should be understood that the above-described discussion is provided for illustrative purposes only and is not intended to limit the scope or subject matter of the appended claims or those of any related patent application or patent.

SUMMARY

An aqueous fluid is provided which is capable of sealing selected permeable zones within a formation penetrated by a well. The aqueous fluid contains a polyacrylamide having a weight average molecular weight from about 1.5 million to 22 million Dalton; nanoparticles and an encapsulated liquid crosslinking agent. The aqueous fluid may be used in a stimulation operation. In an embodiment, the fluid may be used to isolate a targeted zone within the formation in order to produce hydrocarbons from that targeted zone. In another embodiment, the fluid may be used to isolate a zone of high permeability in order to divert a subsequently pumped fluid into a zone of lower permeability. The fluid may be used in the treatment of a geothermal well as well as an oil or gas well.

In an embodiment, a method of enhancing productivity of a producing well is provided wherein a targeted zone of high permeability within the well is plugged and flow of a subsequently pumped treatment fluid is diverted from the plugged targeted zone to a zone of lower permeability. The aqueous fluid first pumped into the well contains (i) nanoparticles; (ii) a polyacrylamide having a weight average molecular weight from about 1.5 million to 22 million Dalton; and (iii) an encapsulated liquid crosslinking agent. Upon release, the crosslinking agent interacts with the nanoparticles and polyacrylamide to produce a viscous gel. The downhole temperature in the well at the time of release of the crosslinking agent is at least 85° C. The viscous gel flows to a targeted zone within the formation and a barrier plug is formed across the targeted zone. The barrier plug is stable and typically starts to degrade only after a prolonged period of time. While degradation may commence one hour after pumping of the fluid, degradation usually does not start until after at least eight hours from pumping of the fluid. In other cases, degradation may be delayed for up to 48 hours after pumping of the fluid. Still, in other cases, degradation may not occur until two weeks after pumping of the fluid. Flow of subsequently introduced fluid is diverted from the plugged targeted zone into a second zone. The downhole temperature in the well during diversion of the subsequently introduced fluid may be at least 125° C., in some cases at least 300° C. and in other cases as high as 350° C.

In another embodiment, a method of stimulating a subterranean formation is provided wherein a first aqueous fluid is pumped into a reservoir penetrating the formation. The first aqueous fluid contains nanoparticles, a polyacrylamide having a weight average molecular weight from about 1.5 million to 22 million Dalton; and an encapsulated liquid crosslinking agent. The first aqueous fluid is gelled, thereby forming a plug in a targeted zone within the formation; the plug forming a fluid impermeable barrier effective over a period of at least 48 hours at a downhole temperature of 300° C. or higher. One or more second fluids may then be pumped into the reservoir. Flow of the one or more second fluids is diverted from the targeted zone to one or more second zones; the permeability of the targeted zone being higher than the permeability of the one or more second zones.

In another embodiment, a method of enhancing productivity of a well having multiple productive zones is provided wherein, after perforating and fracturing a targeted zone, an aqueous fluid is introduced to the targeted zone. The aqueous treatment fluid comprising (i) nanoparticles; (ii) a polyacrylamide having a weight average molecular weight from about 1.5 million to 22 million Dalton; and (iii) an encapsulated liquid crosslinking agent. The targeted zone is isolated from non-stimulated zones of the well by gelling the fluid to create a temporary plug. In an embodiment, the downhole temperature in the well is 300° C. or above.

In another embodiment, a method of enhancing productivity of well having multiple productive zones is provided wherein an aqueous fluid is introduced to a pre-determined productive zone, the aqueous treatment fluid comprising (i) nanoparticles; (ii) a polyacrylamide having a weight average molecular weight from about 1.5 million to 22 million Dalton; and (iii) an encapsulated liquid crosslinking agent. The pre-determined productive zone is isolated from the other zones of the well by gelling the fluid. The downhole temperature in the well is 300° C. or above. The pre-determined productive zone is treated with stimulation fluid. Stimulation of the isolated pre-determined productive zone may be over a period of at least 48 hours.

DRAWINGS

The following figures are part of the present specification, included to demonstrate certain aspects of various embodiments of this disclosure and referenced in the detailed description herein:

Figure 10:
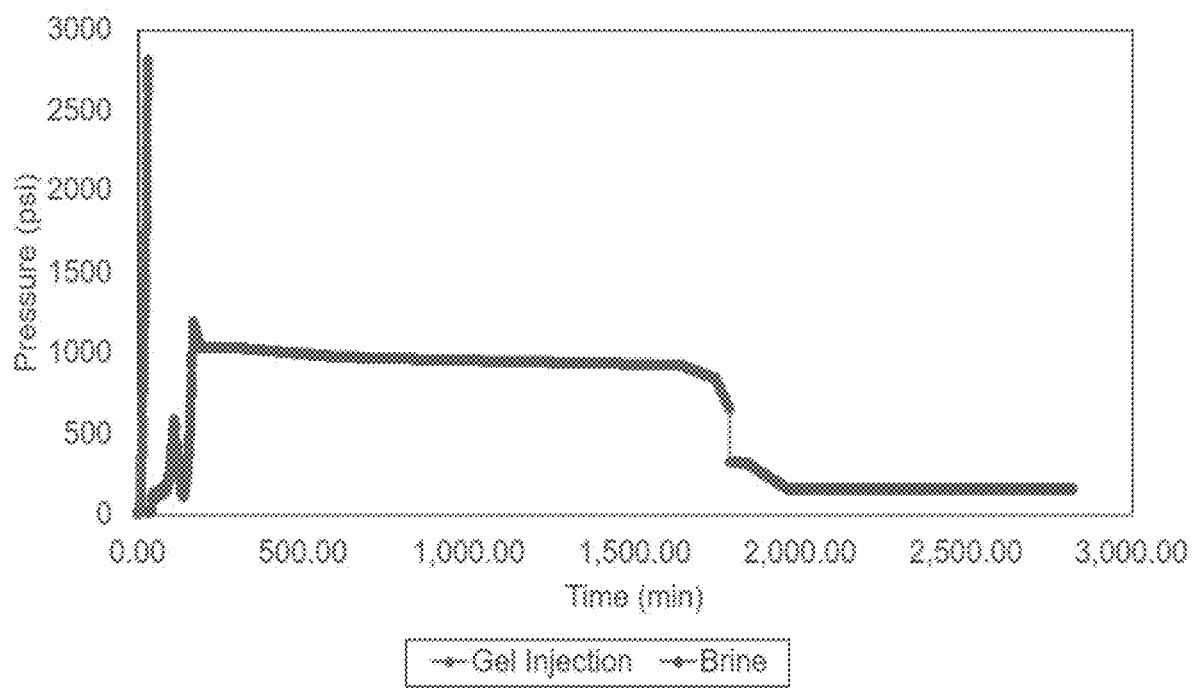

FIG. 10 demonstrates the aqueous fluid disclosed herein forming a temporary fluid block at a pressure differential of 2,000 psi at 300° C.

DETAILED DESCRIPTION

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

All ranges disclosed herein are inclusive of the endpoints. A numerical range having a lower endpoint and an upper endpoint shall further encompass any number and any range falling within the lower endpoint and the upper endpoint. For example, every range of values (in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

"Optional" or "optionally" means that the subsequently described event or circumstance can or cannot occur, and that the description includes instances where the event occurs and instances where it does not.

The aqueous fluid used in the disclosed methods contains three principal components: (i) nanoparticles; (ii) a polyacrylamide having a weight average molecular weight from about 1.5 million to 22 million Dalton; and (iii) an encapsulated liquid crosslinking agent. The aqueous fluid targets selected zones in wells having a temperature of at least 125° C., in some cases at least 300° C. and in other cases as high as 350° C. In a preferred embodiment, the well to which the fluid is introduced is a geothermal well. In other embodiments, the fluid may be introduced to a gas or oil well. The wells may be completed open hole wells, with slotted or pre-perforated liners.

The polyacrylamide, when added to the nanoparticles and crosslinking agent, may be in the form of an emulsion, an oil slurry or a dry powder.

In an embodiment, the aqueous fluid, prior to being gelled, may comprise between from about 2.000 to about 50.000 ppm of the polymer by weight, more typically from about 10,000 to 30,000 ppm, more desirably between from about 12,000 to about 20,000 ppm.

In an embodiment, the polyacrylamide introduced to the crosslinking agent and nanoparticles may be partially hydrated in an aqueous emulsion or formulated into a slurry in which droplets of the aqueous phase containing the polyacrylamide are dispersed in an oil phase. Suitable oils include mineral oil and diesel oil.

In an embodiment, powdered polyacrylamide may be mixed with an aqueous hydrating medium prior to pumping and/or during pumping into the well. In such instances, the polyacrylamide powder is at least 80% by weight active, preferably at least 90%, in some cases, 95% by weight active.

In an embodiment, the hydrating medium may be pumped through a main line down a wellbore and dry polyacrylamide powder may be injected into the hydrating medium during pumping where it is mixed with the crosslinking agent and nanoparticles. In an embodiment, the polyacrylamide may be in the shape of microbeads; the diameter of the microbeads often being between from about 0.5 to 2.0 microns.

Typically, the polyacrylamide is substantially evenly distributed within the aqueous fluid prior to the fluid being gelled.

The fluid, when pumped into the well (or upon formulation in the well from dry polyacrylamide), has a viscosity ranging less than 50 cP or even less than 15 cP. (Viscosity measurements referenced herein were made on a Malvern Kinexus Pro rotational rheometer at 100 sec$^{-1}$ at 25° C.)

The gel is formed upon degradation of the encapsulating media which surrounds the liquid crosslinking agent and reaction between the polyacrylamide and crosslinking agent. Degradation of the encapsulating media may occur by hydrolysis, solvolysis, melting or other mechanism. Since the crosslinking agent is encapsulated, timing of gelation of the fluid can be controlled by varying parameters which result in the degradation of the encapsulating media.

Upon being pumped into a reservoir, the fluid forms a gel at elevated temperatures. In some embodiment, the gel may be formed at temperatures of 85° C. and above, more typically at temperatures 90° C. and above. The gel is stable at high pressures as well as high temperatures. The thermal stability of the gelled fluid may be attributable to the presence of the combination of the polyacrylamide and nanoparticles. For instance, thermal stability of the polymer may be increased by the presence of the nanoparticles.

The gelled fluid forms a fluid-impermeable barrier or plug, i.e., a barrier or plug which isolates, substantially impairs or prevents the flow of fluids to locations where flow of fluids is not desirable, such as previously stimulated intervals.

In an embodiment, the gel is capable of withstanding differential pressures of 800 psi (typically greater than 1,000 psi, often greater than 1,5000 psi or more) at downhole temperatures in excess of 250° C. (typically greater than 300° C. and often greater than 325° C. or 350° C.). At such temperatures and pressures, the gel is stable for one hour, often eight hours, typically up to 48 hours and in some cases up to two weeks.

Breaking of the gelled fluid does not require introduction of a breaker into the well or inclusion of a breaker in the aqueous fluid. When the gel is broken, it does not self-heal, i.e., no bonding interaction occurs between the polyacrylamide and crosslinking agent when broken. As such, the broken gel can be more easily removed from the well during flowback.

The ionic charge of the polyacrylamide may be from 0 to 100 percent. The polyacrylamide is preferably ionic; for example anionic.

The polyacrylamide is typically a homopolymer of acrylamide (PAM), poly(acrylamide) alkali metal salt or a partially hydrolyzed poly (acrylamide) (HPAM).

The weight average molecular weight of the polyacrylamide is from about 8 to about 22 million Dalton, typically from about 5 to about 20 million Dalton and sometimes between from about 6 to 8 million Dalton. The molecular weight of the polymer may be dependent on the hydrolysis level. In some instances, the degree of hydrolysis of the acrylamide units of the polymer is from about 0.15 to about 0.40, more typically from about 0.25 to about 0.35, most typically about 0.30.

In an embodiment, the preferred polyacrylamide is a HPAM, such as a straight chain polymer of acrylamide monomers which may be represented by the structural formula:

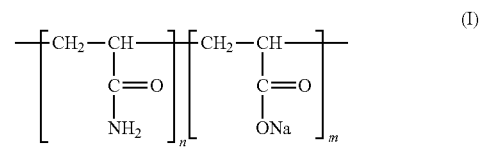

(I)

wherein the molar ratio of m:n is from about 5:95 to about 95:5. Typically, the polymer is a flexible chain structure characterized by a random coil.

The gel is formed in-situ by crosslinking the polyacrylamide with liquid crosslinking agent. The crosslinking agent is encapsulated. Crosslinking does not occur until the crosslinking agent is released. Typically, the encapsulating medium does not degrade and release the crosslinking agent until a downhole temperature between from 85 to about 135, more typically from about 90 to about 110, ° C. is reached.

The crosslinking agent may be suitable for forming ionic bonding and/or covalent bonding with the polyacrylamide. More typically, the crosslinking agent is a metal or forms a coordination complex or metal complex with the polymer chains. Preferably, the metal is a source of a polyvalent metal ion suitable to crosslink with a functional group on the polymer such as the acrylamide or carboxylate groups on PAM and/or HPAM. The crosslinking agent is, for instance, organometallic wherein the metal may be Cr(III), Cr(IV), Ti(IV), Al(III), Zr(IV), Ca2+, Mg2+, Zn2+ and combinations thereof. The metal preferably is a chromium compound, most particular Cr (III) ions. The counterion or ligand of the crosslinking agent may include acetate, propionate, lactate, oxalate, malonate, maleate, succinate, glutamate or citrate. Alternatively, the crosslinking agent may be a complex of one of the aforementioned metals and an inorganic counterion such as phosphonate, sulfonate, carbonate or halide. In a preferred embodiment, the crosslinking agent is chromium acetate or a chromium chloride.

In a preferred embodiment, the gel formed is a hydrolyzed polyacrylamide/chromium III acetate gel. The combination of HPAM or PAM with $Cr^{3+}$ results in a physically crosslinked gel because of complexes formed between the metal and the carboxylic acid groups on the HPAM or PAM.

Methods of encapsulating crosslinking agents are well known in the art. For instance, the crosslinking agent may be encapsulated by a polymer. Polymers suitable for degradation at a temperature of 85° C. and above include homo- and co-polymers of glycolate and lactate, polycarbonates, polyanhydrides, polyorthoester and polyphosphazenes. Exemplary polymers include, for example, poly(lactic acid-co-glycolic acid).

In a preferred embodiment, the encapsulating layer is an organophosphorus such as a phospholipid, like lecithin. The lecithin may be natural or synthetic lecithin. Suitable lecithins include, in particular, soybean lecithins or soya lecithin. Preferred phospholipids and lecithin include one or more glycerophospholipids such as phosphatidylcholine, phosphatidylethanolamine, phosphatidylinositol, phosphatidylserine and phosphatidic acid.

The crosslinking agent may be encapsulated by the polymer by known methods such as double emulsion and spray drying processes. The double emulsion process principally proceeds by emulsifying an aqueous solution containing the crosslinking agent in a first organic compound containing the encapsulating polymeric layer. A primary emulsion is produced by mixing. The organic compound may be, for example, dichloromethane, ethyl acetate, cyclohexane or a mixture thereof. The primary emulsion is then dispersed in a second aqueous solution and then emulsified to produce a secondary emulsion. The second aqueous solution may include hydrophilic stabilizers, such as polyvinyl alcohol and surfactants. The secondary emulsion is then evaporated by freeze or spray drying or another method to remove the first organic compound and the second aqueous solution, leaving the encapsulated crosslinking agent. Spraying drying generally involves atomization of a liquid feedstock comprising the encapsulating polymeric layer and the crosslinking agent into a spray of droplets. The droplets are typically dried with hot air in a drying chamber. Generally, the spray is produced by rotary or nozzle atomizers.

The amount of crosslinking agent, upon release from the encapsulating layer, in the aqueous fluid varies generally over a broad range of about 1 mg per liter of aqueous fluid to about 20.000 mg, preferably, in the range of about 1 mg/l to about 10.000 mg/l, and most preferably, in the range of 1 mg/l to 5,000 mg/l.

The nanoparticles, prior to being introduced into the aqueous fluid, have a number average particle size suitable for rendering the gelled fluid. For example, the nanoparticles may be less than 2,000 nm in diameter, typically less than 1,000 nm and preferably to about 500 nm in diameter, more preferably from about 5 to about 250 nm, often from about 5 to about 100 nm, 5 to about 50 nm, or about 9 nm to about 25 nm in diameter. [Generally, as used herein, "particle size" refers to the number averaged particle size along the longest particle dimension, and can be determined using particle size measurement methods known in the art, such as laser light scattering (static or dynamic light scattering), or direct determination methods such as scanning electron microscopy (SEM) or transmission electron microscopy (TEM)]. Typically, the nanoparticles referenced herein are spherical.

The concentration of nanoparticles in the aqueous fluid with crosslinking agent and polyacrylamide prior to being gelled may be 0.1% (8.34 pounds per thousand gallons ("pptg") by weight based on the total weight of the aqueous fluid or above. In other cases, the concentration of nanoparticles in the aqueous fluid may be greater than 0.5% (about 41.7 pptg) by weight based on the total weight of the aqueous fluid. In an embodiment, the concentration of nanoparticles can range from about 2% to about 20% by weight (about 167 pptg to about 1670 pptg). Once the polyacrylamide is crosslinked, the nanoparticles remain dispersed in the crosslinked gel.

Suitable nanoparticles include inorganic nanoparticles such as a metal or metalloid oxide or hydroxide like silica, alumina, titania, silicic acid, aluminum oxides, aluminum hydroxides, aluminum hydroxyoxides, aluminosilicates, zirconium oxides, zirconium hydroxides, zirconium hydroxyoxides, tungsten oxide or iron oxide as well as a metal or metalloid carbide like tungsten carbide, silicon carbide and boron carbide and metal or metalloid nitrides like titanium nitride, boron nitride and silicon nitride or a combination thereof. Metal nanoparticles include alkali metals, alkaline earth metals, inner transition metals (a lanthanide or actinide), a transition metal, or a post-transition metal. Examples of such metals include magnesium, aluminum, iron, tin, titanium, platinum, palladium, cobalt, nickel, vanadium, chromium, manganese, zirconium, ruthenium, hafnium, tantalum, tungsten, rhenium, osmium, alloys thereof as well as barium or strontium titanate or a combination thereof. Preferred nanoparticles include alumina, boehmite and zirconia.

Other suitable nanoparticles include fullerenes, nanotubes, graphenes like nanographite, nanodots, nanorods, nanodiamonds, polysilsesquioxanes, antimony oxide, vanadium oxide and magnesium oxide and mixtures thereof.

Fullerenes include cage-like hollow polyhedral allotropic carbon forms possessing a polyhedral structure and include those having from about 20 to about 100 carbon atoms.

Nanographites may be represented as clusters of plate-like sheets of graphite having a stacked structure of one or more layers of graphite of plate-like two-dimensional structures of fused hexagonal rings Suitable graphenes including nanographene and graphene fibers (graphene particles having an average largest dimension of greater than 1 µm, a second dimension of less than 1 µm, and an aspect ratio of greater than 10, where the graphene particles form an interbonded chain). The graphene and nanographene fibers are effectively two-dimensional particles having more than one layer of fused hexagonal rings. Typically, the graphene nanoparticles may be prepared by exfoliation of a graphite source such as nanographite, graphene or nanographene, graphite and intercalated graphite. Exemplary exfoliation methods include fluorination, acid intercalation as well as acid intercalation followed by high temperature treatment Exfoliation of the nanographite provides a nanographene having fewer layers than non-exfoliated nanographite. Exfoliation of nanographite may provide the nanographene as a single sheet only one molecule thick, or as a layered stack of sheets. In an embodiment, the exfoliated nanographene may have fewer than 50 single sheet layers and in another embodiment fewer than 5 single sheet layers.

Suitable nanotubes include carbon nanotubes, inorganic nanotubes (e.g., boron nitride nanotubes), metallated nanotubes or a combination thereof. Suitable nanotubes include single walled nanotubes (SWNTs) or multi-walled nanotubes (MWNTs).

Suitable polysilsesquioxanes (also referred to as polyorganosilsesquioxanes or polyhedral oligomeric silsesquioxanes (POSS) derivatives) are polyorganosilicon oxide compounds of general formula $RSiO_{1.5}$ (where R is an organic group such as methyl) having defined closed or open cage structures (closo or nido structures). Polysilsesquioxanes, including POSS structures may be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

In addition, the nanoparticles may further be nano-layered silicates or nanoclays (hydrated or anhydrous silicate, plate-like minerals with a layered structure). Exemplary nanoclays include aluminosilicate clays like kaolins (including vermiculite), hallyosite, bentonite, smectites (including montmorillonite), saponite, beidellite, nontrite, hectorite, allophane and illite as well as titanium sulfate and zirconium sulfate. The nanoclays may be exfoliated to separate individual sheets, or non-exfoliated. Other nanosized mineral fillers of similar structure which may be used include talc, micas including muscovite, phlogopite or phengite. Platelets of the nanoclay typically have a thickness of about 3 to about 1000 Angstroms, a size in the planar direction ranging from about 0.01 μm to 100 μm and a specific surface area in from about 90 to about 800 $m^2/g$. The aspect ratio (length versus thickness) is generally in the order of about 10 to about 10,000.

Further, the nanoparticles may be derivatized to include a variety of different functional groups such as, for example, carboxy (e.g., carboxylic acid and anhydride groups like maleic anhydride), epoxy, ether, ketone, amine, hydroxy, alkoxy, alkyl, aryl, aralkyl, alkaryl, lactone as well as functionalized polymeric or oligomeric groups. In an embodiment, the nanoparticles include a combination of derivatized nanoparticles and underivatized nanoparticles.

The nanoparticles may further be derivatized to include one or more functional groups that are hydrophilic, hydrophobic, oxophilic, lipophilic, or oleophilic. In an embodiment, such functional groups may include (i) organosilicon materials, (ii) fluorinated organic acids or a reactive derivative; (iii) linear or branched alkyl organic acids or a reactive derivative, (iv) substituted alkyl organic acids or a reactive derivative, (v) aryl or substituted aryl organic acids or a reactive derivative as well as (vi) mixtures thereof.

In an embodiment, the surface modifying agent is an organic acid having a long chain alkyl, aryl or fluoro group. Suitable organic acids include carboxylic acids, sulfonic acids, phosphoric acids, phosphonic acids and phosphinic acids.

Exemplary carboxylic acids include those of the formula R—COOH where R is a linear or branched $C_9$-$C_{24}$, preferably $C_{12}$-$C_{21}$ hydrocarbon group or a hydroxylated derivative thereof or a $C_6$-$C_{20}$ aryl, alkylaryl or arylalkyl group. Suitable carboxylic acids include behenic acid, palmitic acid, etc. In an embodiment, the organic acid of the hydrophobic and/or oleophobic surface modifying agent has two or more carboxylic acid moieties and preferably wherein the number average molecular weight of the organic acid is between from about 80 g/mol to about 2,000 g/mol.

Suitable reactive derivatives of organic acids as referenced herein include acid chlorides such as those of the formula R'(C=O)Cl, esters such as those of the formula R'—COOR" and corresponding acid anhydrides. In an embodiment R' and R" may be a $C_1$-$C_8$ hydrocarbon group or R as defined above.

In an embodiment, the hydrophobic and/or oleophobic surface modifying agent may be an organophosphoric acid, organophosphonic acid or organophosphinic acid or a derivative thereof. The organo groups of the anchor may be monomeric or polymeric.

Examples of monomeric phosphoric acid and derivatives have the structure $(RO)_x$—P(O)—$(OR')_y$ wherein x is 1-2, y is 1-2 and x+y=3; R preferably is a radical having a total of 1-30, preferably 2-20, more preferably 6-18 carbons; R' is H, a metal such as an alkali metal, for example, sodium or potassium or lower alkyl having 1 to 4 carbons, such as methyl or ethyl. Preferably, a portion of R' is H. The organic component of the phosphoric acid (R) can be a saturated or unsaturated aliphatic group or can be an aryl or aryl-substituted moiety. At least one of the organo groups can contain terminal or omega functional groups as described below.

Examples of monomeric phosphonic acid or derivatives include compounds or mixtures of compounds having the formula:

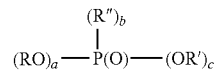

wherein a is 0-1, b is 1, c is 1-2 and a+b+c is 3; R and R" preferably are each independently a radical having a total of 1-30, preferably 2-20, more preferably 6-18 carbons; R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be a saturated or unsaturated aliphatic group or an aryl or aryl-substituted moiety. At least one of the organo groups can contain terminal or omega functional groups as described below.

Examples of monomeric phosphinic acid or derivatives are compounds or mixtures of compounds having the formula:

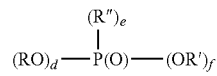

wherein d is 0-2, e is 0-2, f is 1 and d+e+f is 3; R and R" preferably are each independently radicals having a total of 1-30, preferably 2-20 carbons atoms, more preferably 6-18 carbons; R' is H, a metal, such as an alkali metal, for example, sodium or potassium or lower alkyl having 1-4 carbons, such as methyl or ethyl. Preferably a portion of R' is H. The organic component of the phosphinic acid (R, R") can be a saturated or unsaturated aliphatic group or be an aryl or aryl-substituted moiety. Examples of organo groups which may comprise R and R" include long and short chain aliphatic hydrocarbons, aromatic hydrocarbons and substituted aliphatic hydrocarbons and substituted aromatic hydrocarbons.

At least one of the organo groups can further contain one or more terminal or omega functional groups which are hydrophobic. Examples of terminal or omega functional groups include carboxyl such as carboxylic acid, hydroxyl, amino, imino, amido, thio and phosphonic acid, cyano, sulfonate, carbonate and mixed substituents.

Representative of organophosphorus acids or derivatives are amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, styrene phosphonic acid, and dodecyl bis-1,12-phosphonic acid.

In addition to monomeric organophosphorus acid and derivatives, oligomeric or polymeric organophosphorus acid derivatives resulting from self-condensation of the respective monomeric acids may be used.

The hydrophobic and/or oleophobic surface modifying treatment agent may contain fluorine. In an embodiment, the hydrophobic and/or oleophobic surface modifying treatment agent contains a fluorine containing moiety having a number average molecular weight of less than 2000. Preferred fluorinated materials are esters of perfluorinated alcohols such as the alcohols of the structure F—(CFY—$CF_2$)$_m$—$CH_2$—$CH_2$—OH where Y is F or $C_nF_{2n+1}$; m is 4 to 20 and n is 1 to 6. Further preferred fluorinated materials are those of the structure $R_f$—($CH_2$)$_p$—X where $R_f$ is a perfluoroalkylene ether group or a perfluorinated alkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage.

In another embodiment, the organic acid of the hydrophobic and/or oleophobic surface modifying agent is a phosphoric acid, phosphonic acid, phosphinic acid or sulfonic acid having 1 to about 30 acid groups. In an embodiment, the number average molecular weight of the phosphoric acid, phosphonic acid, phosphinic acid or sulfonic acid is between from about 100 g/mol to about 5,000 g/mol.

In an embodiment, the hydrophobic and/or oleophobic surface modifying agent is of the formula $R_f$-(D)$_p$-Z where Z is the organic acid moiety, D is —$CH_2$ or an (OE)$_p$ group, E is a $C_1$-$C_3$ alkylene group, $R_f$ is a perfluorinated alkyl group or contains a perfluorinated alkylene ether group, particularly a perfluorinated alkyl group or perfluorinated alkylene ether group referenced herein, and p is 2 to 4.

In an embodiment, the surface modifying treatment agent may contain the moiety $R_f$—($CH_2$)$_p$— where $R_f$ is a perfluorinated alkyl group or contains a perfluorinated alkylene ether group and p is 2 to 4, preferably 2.

Further examples of perfluorinated groups for the fluorine containing moiety are those of the structure:

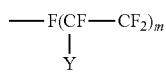

where Y is F or $C_nF_{2n+1}$; m is 4 to 20 and n is 1 to 6.

A preferred oligomeric or perfluoroalkylene ether group is where R and/or R" is a group of the structure:

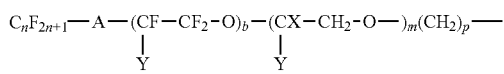

where A is an oxygen atom or a chemical unit such as —$CF_2$; n is 1 to 20, preferably 1 to 6; Y is H, F, $C_nH_{2n+1}$ or $C_nF_{2n+1}$; X is H or F; b is at least 1, preferably 2 to 10, m is 0 to 50, and p is 1 to 20.

In a preferred embodiment, the surface modifying treatment agent is of the formula $R_f$—($CH_2$)$_p$—Z where Z, the situs of the attachment of the treatment agent to the nanoparticle surface is H, F or an acid derivative, and the hydrophobic and/or oleophobic portion (bonded to the surface of the nanoparticle) is the $R_f$—($CH_2$)$_p$— moiety where $R_f$ is a perfluorinated alkyl group or contains a perfluorinated alkylene ether group referenced above and p is 2 to 4, preferably 2.

In another embodiment, the surface modifying treatment agent is of the formula $R_f$—($CH_2$)$_p$—Z, wherein Z is:

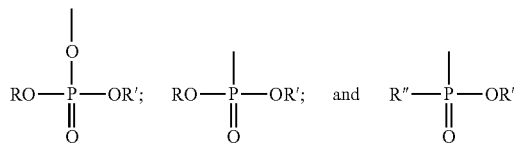

as referenced above and in a preferred embodiment where R and R" independently may be a hydrocarbon or substituted hydrocarbon radical having up to 200, such as 1 to 30 and 6 to 20 carbons, R and R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

In an embodiment, the surface modifying treatment agent is of the formula $CF_3(C_nF_{2n})CH_2CH_2PO_3H_2$ where n is between 3 and 5 or $CF_3(CF_2)_xO(CF_2CF_2)_y$—$CH_2CH_2$—$PO_3H_2$ where x is from 0 to 7, y is from 1 to 20 and x+y is less than or equal to 27.

In another embodiment, the organo-silicon containing material may be a silane, polysiloxane or a polysilazane. In an embodiment, the organo-silicon containing compound may be an organo(poly)siloxane or organo(poly)silazane of molecular weight of at least 400, usually between 1000 and 5,000,000.

Examples of organo-silicon materials are alkoxysilanes as well as acidic compounds having a branched or unbranched alkyl group.

Suitable organo-silicon containing materials further include those of the formula $R^1_{4-x}SiA_x$ or $(R^1_3Si)_yB$ as well as organo(poly)siloxanes and organo(poly)silazanes containing units of the formula:

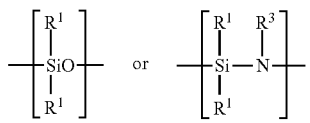

where $R^1$ may be the same or different and is a hydrocarbon radical containing from 1 to 100, such as 1 to 20 carbon atoms and 1 to 12, preferably 1 to 6 carbon atoms and $R^3$ may be hydrogen or a hydrocarbon or substituted hydrocarbon having 1 to 12, preferably 1 to 6 carbon atoms. In addition, $R^1$ may be a substituted, hydrocarbon radical such as halo, particularly a fluoro-substituted hydrocarbon radical. The organo(poly)siloxane may further contain additional units of the formula: $R^5{}_2SiO_2$ where $R^5$ is a halogen such as a chloro or fluoro substituent.

The substituent A in $R^1{}_{4-x}SiA_x$ may be hydrogen, a halogen such as chloride, OH, $OR^2$ or

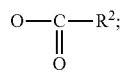

B in the formula $(R^1{}_3Si)_yB$ may be $NR^3{}_{3-y}$, $R^2$ a hydrocarbon or substituted hydrocarbon radical containing from 1 to 12, typically 1 to 4 carbon atoms. $R^3$ is hydrogen or has the same meaning as $R^1$, x is 1, 2 or 3 and y is 1 or 2.

Preferably, R' is a fluoro-substituted hydrocarbon. Preferred are such fluoro-substituted hydrocarbons are those of the structure:

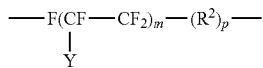

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

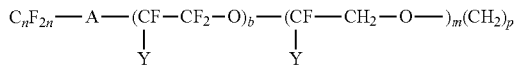

where A is an oxygen atom or a chemical unit; n is 1 to 6, Y is F or $C_nF_{2n}$; b is at least 1, such as 2 to 10; m is 0 to 6 and p is 0 to 18.

Preferred organo-silicon materials include halogenated siloxanes, halogenated alkoxysiloxanes such as perfluoroalkoxysiloxane (PFOSi), alkoxy halogenated alkoxysilanes, such as alkoxy-perfluoroalkoxysilane; alkoxyacetylacetonate halogenated polysiloxanes, such as alkoxyacetylacetonate-perfluoroalkoxysiloxane, alkoxy-alkylsilylhalides; polyalkylsiloxanes, such as polydimethylsiloxanes, and alkoxyacetylacetonate-polyalkylsiloxanes, such as alkoxyacetylacetonate (acac) polydimethylsiloxanes. Exemplary surface modifying treatment agents include tantalum halide-perfluoroalkoxysiloxane, such as $TaCl_5$:PFOSi; tantalum alkoxy-perfluoroalkoxysilane; tantalum alkoxyacetylacetonate-perfluoroalkoxysiloxane, like $Ta(EtO)_4acac$:PFOSi; tantalum alkoxy-alkylsilylhalide; tantalum halide-polyalkylsiloxane, like $TaCl_5$:PDMS; niobium alkoxide-perfluoroalkoxysiloxane, such as $Nb(EtO)_5$:PFOSi and $Ta(EtO)_5$: PFOSi; titanium alkoxide-perfluoroalkoxysiloxane, like $Ti(n-BuO)_4$:PFOSi; zirconium alkoxide-perfluoroalkoxysiloxane; lanthanum alkoxide-perfluoroalkoxysilane, like $La(iPrO)_3$:PFOSi; tungsten chloride-perfluoroalkoxysiloxane, like $WCl_6$:PFOSi; tantalum alkoxide-polyalkylsiloxane, like $Ta(EtO)_5$:PDMS; and tantalum alkoxyacetylacetonate-polyalkylsiloxane, like $Ta(EtO)_4acac$:PDMS.

In an embodiment, the fluorinated hydrocarbon is $R_f$—$(CH_2)_p$—X where $R_f$ is a perfluorinated hydrocarbon group including an oxygen substituted hydrocarbon group, such as a perfluorinated alkyl group or a perfluorinated alkylene ether group and p is 0 to 18, preferably 0-4, and X is a polar group such as a is carboxyl, like of the structure —(C═O)— OR; and R is hydrogen, perfluoroalkyl, alkyl or substituted alkyl containing from 1 to 50 carbon atoms.

Examples of perfluoroalkyl groups are those of the structure $F$—$(CFY$—$CF_2)_m$ where Y is F or $C_nF_{2n+1}$; m is 4 to 20 and n is 1 to 6.

Examples of perfluoroalkylene ether groups are those of the structure:

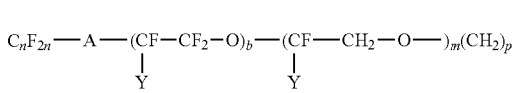

where A is an oxygen atom or a chemical unit; n is 1 to 6, Y is F or $C_nF_{2n}$; b is 2 to 20, m is 0 to 6, and p is 0 to 18, preferably 2 to 4 and more preferably 2.

In an exemplary embodiment, the nanoparticles are derivatized by amination to include amine groups, where amination may be accomplished by nitration followed by reduction, or by nucleophilic substitution of a leaving group by an amine, substituted amine, or protected amine, followed by deprotection as necessary. In another embodiment, the nanoparticles are derivatized by oxidative methods to produce an epoxy, hydroxy group or glycol group using a peroxide, or by cleavage of a double bond by for example a metal mediated oxidation such as a permanganate oxidation to form ketone, aldehyde, or carboxylic acid functional groups.

Where the functional groups are alkyl, aryl, aralkyl, alkaryl, functionalized polymeric or oligomeric groups, or a combination of these groups, the functional groups may be attached through intermediate functional groups (e.g., carboxy, amino) or directly to the derivatized nanoparticles by a carbon-carbon bond without intervening heteroatoms, to provide greater thermal and/or chemical stability to the derivatized nanoparticles by a carbon-oxygen bond (where the nanoparticles contain an oxygen-containing functional group such as hydroxy or carboxylic acid); or by a carbon-nitrogen bond (where the nanoparticles contain a nitrogen-containing functional group such as amine or amide). In an embodiment, the nanoparticles may be derivatized by metal mediated reaction with a C6-30 aryl or C7-30 aralkyl halide (F, Cl, Br, I) in a carbon-carbon bond forming step.

In another embodiment, nanoparticles such as fullerene, nanotubes, nanodiamond, or nanographene may be directly metallated by reaction with e.g., an alkali metal such as lithium, sodium, or potassium, followed by reaction with a C1-30 alkyl or C7-30 alkaryl compound with a leaving group such as a halide (Cl, Br, I) or other leaving group (e.g., tosylate, mesylate, etc.) in a carbon-carbon bond forming step. The aryl or aralkyl halide, or the alkyl or alkaryl compound, may be substituted with a functional group such as hydroxy, carboxy, ether, or the like. Exemplary groups include, for example, hydroxy groups, carboxylic acid groups, alkyl groups such as methyl, ethyl, propyl, butyl, pentyl, hexyl, octyl, dodecyl and octadecyl; aryl groups including phenyl and hydroxyphenyl; alkaryl groups such as benzyl groups attached via the aryl portion, such as in a 4-methylphenyl, 4-hydroxymethylphenyl, or 4-(2-hydroxyethyl)phenyl (also referred to as a phenethylalcohol) group or aralkyl groups attached at the benzylic (alkyl) position such as found in a phenylmethyl or 4-hydroxyphenyl methyl group, at the 2-position in a phenethyl or 4-hydroxyphenethyl group. In an exemplary embodiment, the derivatized nanoparticles are nanographene substituted with a benzyl, 4-hydroxybenzyl, phenethyl, 4-hydroxyphenethyl, 4-hydroxymethylphenyl or 4-(2-hydroxyethyl)phenyl.

In another embodiment, the nanoparticles may be further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by reaction with functional groups.

The nanoparticles when pumped into the well in the aqueous fluid may carry a charge that results in an electric potential in the dispersion, otherwise known as Zeta potential. The Zeta potential of the dispersion can be varied in order to control the viscosity of the fluid pumped into the well. The viscosity of the fluid may be controlled by increasing or decreasing the Zeta potential.

Typically, the gelled fluid is introduced into the well subsequent to stimulation (hydraulic fracturing or acidizing). The gelled fluid forms a fluid barrier to one zone in the formation and subsequently introduced fluid is then diverted to one or other zones. In an embodiment, the gelled fluid forms a fluid permeable barrier to a high permeability (or non-damaged) zone such that subsequently pumped fluid is diverted to a zone of lower permeability. Since conductivity is permeability multiplied by injection geometry, this is synonymous to the statement that the gelled plug is capable of diverting a subsequently pumped fluid from a highly conductive primary fracture(s) to less conductive secondary fractures.

The aqueous fluid may also be used in the isolation of a productive zone in a well having multiple productive zones. After the formation is fractured to render a perforated productive zone, the aqueous fluid may then be introduced into the fractured perforated productive zone. The perforated productive zone may then be isolated by gelling the fluid. If desired, another productive zone of the well may be perforated and the process repeated.

In another embodiment of the invention, the aqueous fluid described herein may be introduced into a pre-determined targeted productive zone of a well containing multiple productive zones. The fluid in the pre-determined targeted productive zone may then be hardened, thereby isolating the pre-determined targeted productive zone from other zones in the well. The pre-determined targeted zone may then be perforated and subjected to hydraulic fracturing since the pre-determined targeted zone is sealed from other zones.

EXAMPLES

Figure 1:
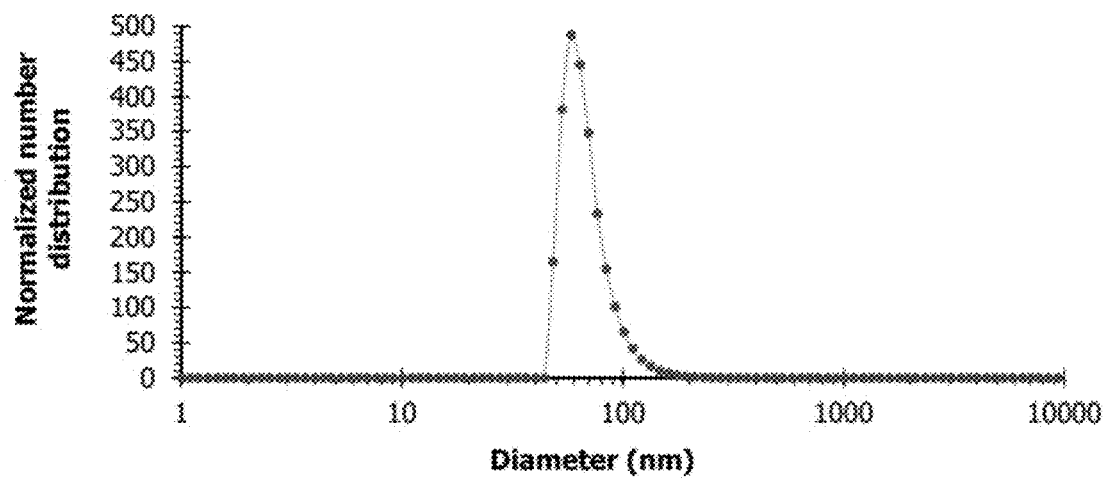
FIG. 1 is a Dynamic Light Scattering (DLS) diagram of encapsulated crosslinker used in the aqueous fluid disclosed herein and demonstrates normalized distribution of the crosslinker when encapsulated by a lecithin containing layer.

Example 1. An encapsulated crosslinker composition was prepared by first shaking a mixture of 5 ml toluene and 50 mg lecithin for 1 minute at 200 rpm. The mixture was then added to 25 ml acetone and 100 mg sorbitan monolaurate surfactant. The mixture was then shaken for another 1 minutes at 200 rpm to render Solution 1. Solution 2 was prepared by mixing 50 m 1 water and 250 ml polysorbate surfactant. The mixture was then introduced to 50 ml chromium (III) acetate solution (containing 11.2 to 11.8% chromium). Solution 1 was then slowly dripped into Solution 2 at a speed of 2 ml/30 sec. After total dripping of Solution 1, the mixture was stirred for 24 hours at room temperature at 150 rpm. Dynamic Light Scattering (DLS) was used to measure the particle size and estimate the distribution of particulate in the encapsulated crosslinker composition. FIG. 1 demonstrates normalized distribution versus diameter of the chrome acetate crosslinker.

Figure 2:
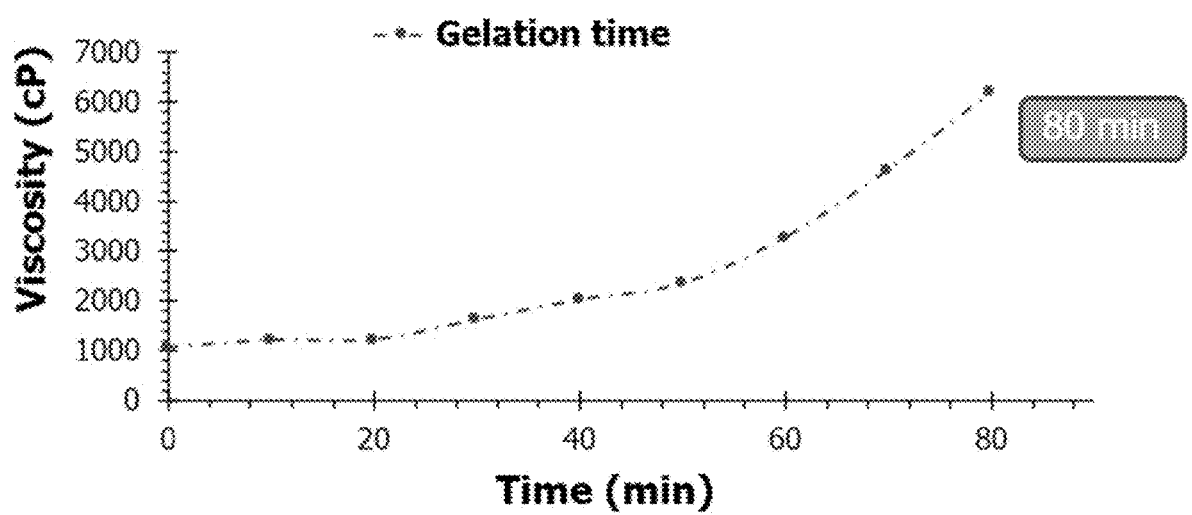
FIG. 2 is the viscosity profile of an aqueous fluid containing 30,000 ppm partially hydrolyzed poly (acrylamide) (HPAM), 750 ppm alumina nanoparticles and a lecithin encapsulated crosslinker at ambient temperature over time.

Example 2. An aqueous fluid was prepared from partially hydrolyzed poly (acrylamide) (HPAM) (10,000, 15,000, 20,000 and 30,000 ppm), alumina nanoparticles (250-750 ppm) and encapsulated crosslinker. The ratio of crosslinker to polymer was 1:20. The rheological properties of the solutions were measured by a rheometer (Malvern Kinexus Pro rotational rheometer) before and after heating. The apparent viscosity was measured at 25 and 90° C. and shear rate of 100 s$^{-1}$. FIG. 2 shows the viscosity profile of the solution prepared with 3,000 ppm HPAM, 750 ppm alumina and 1:20 crosslinker/polymer ratio at ambient temperature over time.

Figure 3:
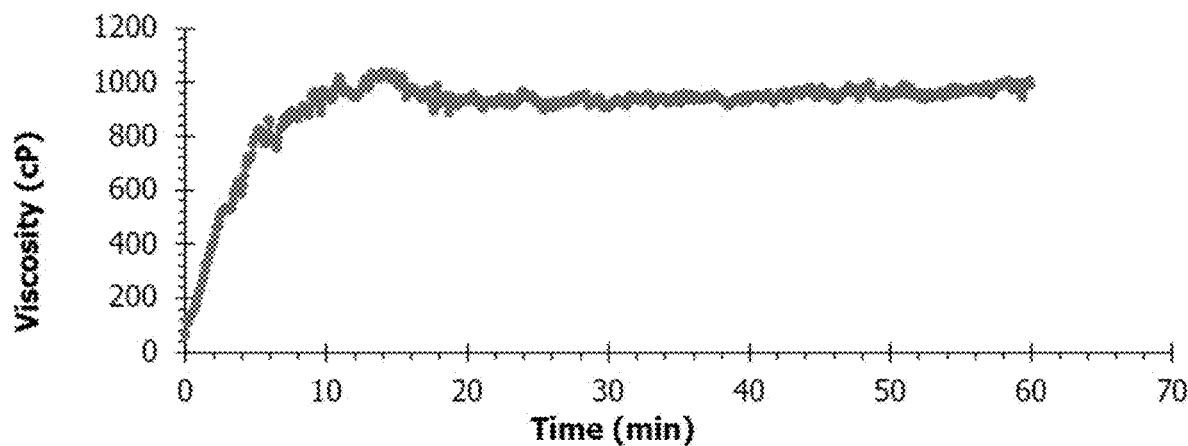
FIG. 3 is the viscosity profile of an aqueous fluid containing 30,000 ppm partially hydrolyzed poly (acrylamide) (HPAM), 750 ppm alumina nanoparticles and a lecithin encapsulated crosslinker at 25° C. at 100/sec.
Figure 4:
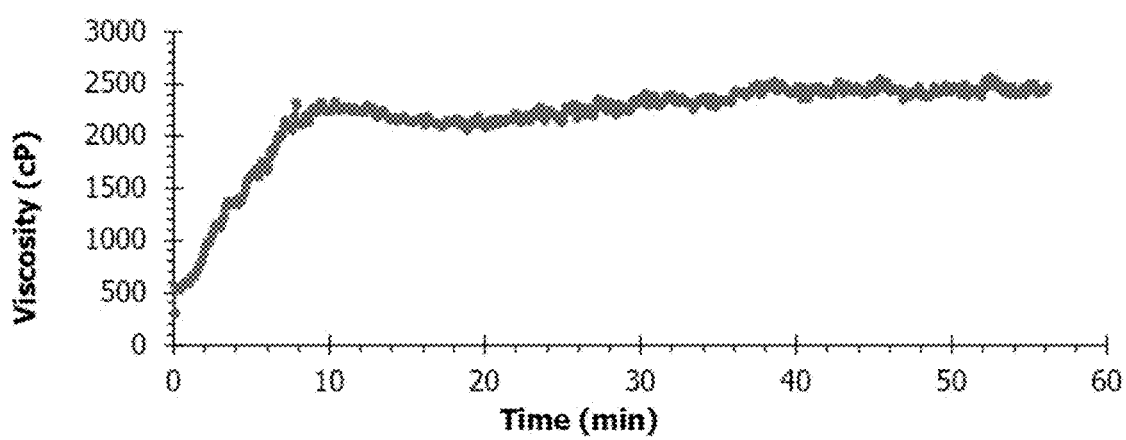
FIG. 4 is the viscosity profile of an aqueous fluid containing 30,000 ppm partially hydrolyzed poly (acrylamide) (HPAM), 750 ppm alumina nanoparticles and a lecithin encapsulated crosslinker at 40° C. at 100/sec.
Figure 5:
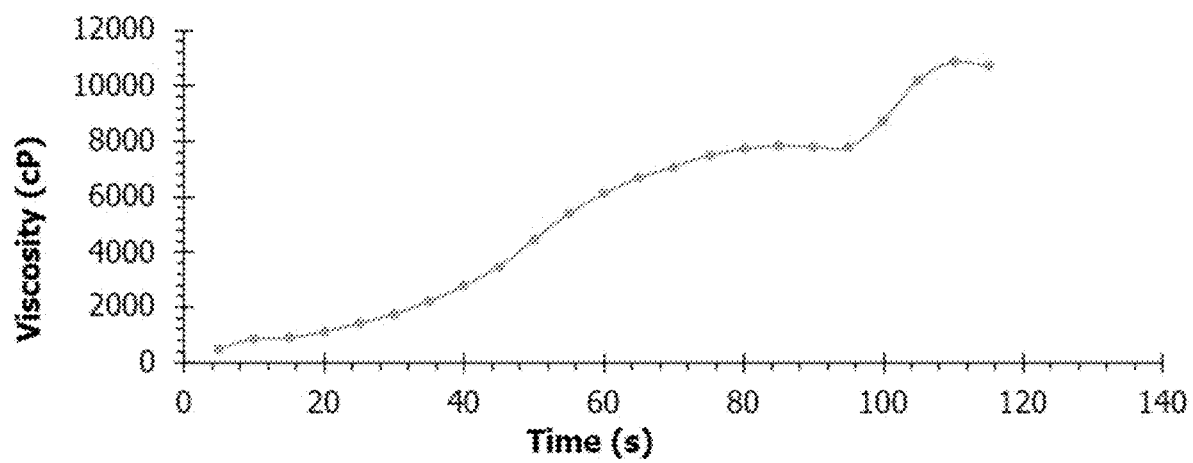
FIG. 5 is the viscosity profile of an aqueous fluid containing 30,000 ppm partially hydrolyzed poly (acrylamide) (HPAM), 750 ppm alumina nanoparticles and a lecithin encapsulated crosslinker at 90° C. at 100/sec.

FIGS. 3, 4 and 5 show the viscosity profile of the solution using the solution containing 30,000 ppm HPAM, 750 ppm alumina nanoparticles and 1:20 weight ratio of encapsulated crosslinker to polyacrylamide measured at 25° C., 40° C. and 90° C., respectively, at 100/s rpm.

Figure 6:
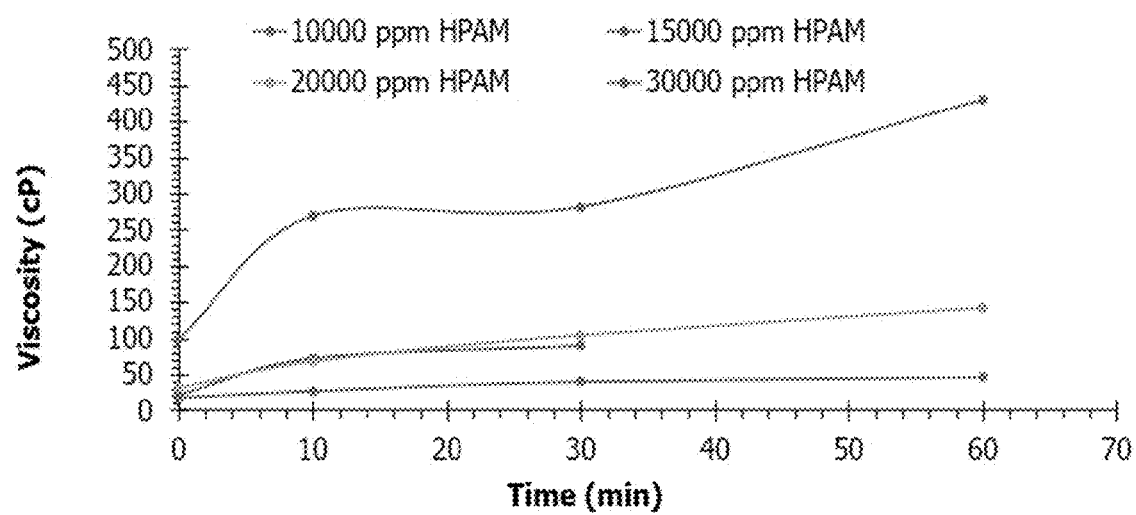
FIG. 6 is the viscosity profile of an aqueous fluid containing 250 ppm alumina nanoparticles, encapsulated crosslinker and varying amounts of HPAM at 25° C. at 100/sec.
Figure 7:
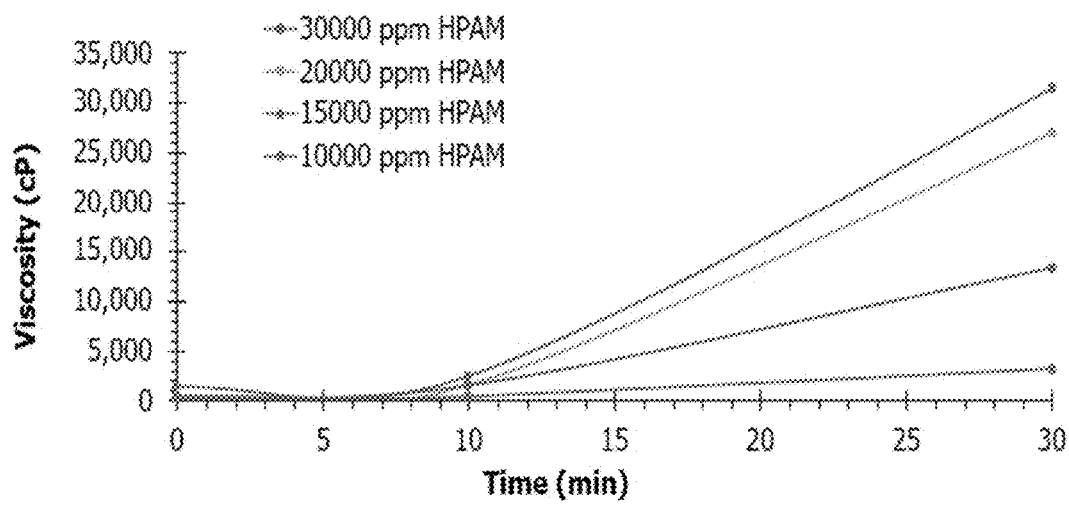
FIG. 7 is the viscosity profile of an aqueous fluid containing 250 ppm alumina nanoparticles, encapsulated crosslinker and varying amounts of HPAM at 90° C. at 100/sec.

Viscosity versus time (gelation time) of the polymer solution was also measured at 25 and 90° C. and the shear rate of 100 S/l. FIGS. 6 and 7 show the viscosity profile of the capsulated crosslinker using different amounts of HPAM (to illustrate optimization concentration) at 25 and 90° C., respectively, at 100/s rpm; the fluid containing HPAM (10,000 ppm; 15,000 ppm; 20,000 ppm; or 30,000 ppm); 250 ppm alumina and weight ratio of capsulated crosslinker/polyacrylamide 1:20.

Figure 8:
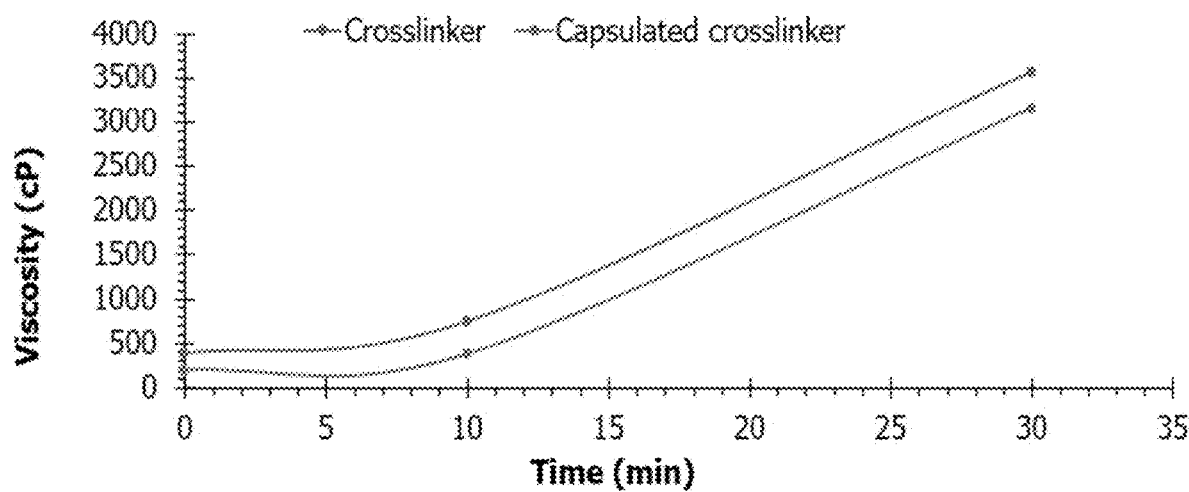
FIG. 8 is the viscosity profile of capsulated crosslinker vs. non-capsulated crosslinker in an aqueous fluid containing 15,000 ppm HPAM and 250 ppm alumina oxide nanoparticles at 90° C.

Example 3. An aqueous fluid was prepared from 15,000 ppm HPAM, 250 ppm alumina oxide nanoparticles and 50 ml encapsulated or non-encapsulated crosslinker of chromium (III) acetate solution (containing 11.2 to 11.8% chromium); weight ratio of crosslinker:polyacrylamide being 1:20. FIG. 8 shows the viscosity profile of the capsulated crosslinker vs. the non-capsulated crosslinker at 100/sec rpm at 90° C.

Examples 1, 2 and 3 demonstrate the extended release of crosslinker into a polyacrylamide containing fluid when using the encapsulated chrome acetate crosslinker. The delayed release enables the polyacrylamide to remain in liquid form with low viscosity for an extended time at elevated temperatures. The release of the crosslinker is demonstrated to be dependent on temperature; here, the release of the crosslinker starting at 90° C.; the delayed release crosslinker then reacting with the polyacrylamide to increase the viscosity of the fluid to form the blocking gel. FIG. 6, for instance, shows the fluid containing 15,000 ppm HPAM provides delayed crosslinking time of the crosslinker and yielding target viscosity after the fluid reaches 90° C.

Figure 9:
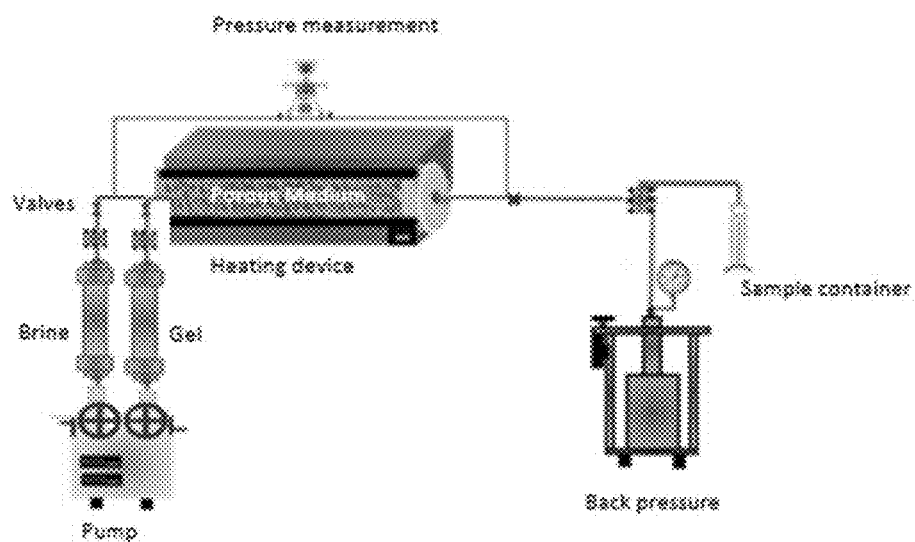
FIG. 9 is a schematic diagram showing testing system having physical properties simulating a geothermal well.

Example 4. The fluid shown in FIG. 6 containing 15,000 ppm HPAM, 250 ppm alumina nanoparticles and the encapsulated crosslinker composition and having a weight ratio of 1:20 crosslinker to polyacrylamide was evaluated in a porous medium testing apparatus which exhibited similar properties seen in a geothermal well. The apparatus consisted of a confinement subsystem (porous medium), a fluid exchanger cylinder, and a constant pressure pump. The injection subsystem consisted of exchanger cylinders and a positive displacement pump. Further included was a pore pressure subsystem with a pressure pump allowing flow only at the pressure defined as pore pressure. Table I summarizes some properties of the porous medium employed and working conditions. FIG. 9 shows a schematic of the equipment set-up.

TABLE I

| Property | Value |
| --- | --- |
| Diameter | 3 ± 0.1 cm |
| Length | 70.0 ± 0.1 cm |
| Poros volume | 68 ± 0.1% cc |
| Permeability | 15 ± 0.2 mD |
| Temperature | 300° C. |
| Back pressure | 1000 and 2000 psi |
| Flow rate | 5 cc/min |

The apparatus was heated at 300° C. and initial permeability was measured by injecting a saline solution including 2 wt. % of NaCl with a flow rate of 5 cc/min. Then, 50 ml of each of the gel samples (crosslinked and encapsulated polymer samples) was injected into the porous medium with the same flow rate (5 cc/min). The setup rested for 2 days at 300° C. and two different delta pressures of 1,000 and 2,000 Psi, respectively. After 2 days, the brine was re-injected into the porous medium with a flow rate of 5 cc/min. The pressure data were recorded versus time to evaluate the thermal resistance and blockage efficiency of the gel sample.

FIG. 10 shows the solution providing a temporary blockage in the defined core (of Table I) and confirms the formulation provides the temporary blocking properties in the selected core. This establishes that the fluid is able to withstand a pressure differential pressure (DP) of 2,000 psi at 300° C. and reverts back to its liquid state after 2 to 3 days. (After 2-3 days, the DP starts to drop which demonstrates the fluid breaking and going back to its liquid state.)

Embodiment 1. A method of enhancing productivity of fluids from a subterranean formation penetrated by a well comprising pumping into the well an aqueous fluid comprising:
(i) nanoparticles;
(ii) a polyacrylamide having a weight average molecular weight from about 1.5 million to 22 million Dalton; and
(iii) an encapsulated liquid crosslinking agent.

Embodiment 2. A method of enhancing productivity of a producing well comprising:
(a) pumping an aqueous fluid into the well, the fluid comprising:
  (i) nanoparticles;
  (ii) a polyacrylamide having a weight average molecular weight from about 1.5 million to 22 million Dalton; and
  (iii) an encapsulated liquid crosslinking agent
(b) releasing the encapsulated crosslinking agent and forming a viscous fluid from interaction of the nanoparticles, polyacrylamide and crosslinking agent when the downhole temperature in the well is at least 85° C.;
(d) transporting the viscous fluid to a targeted zone within the well and forming a barrier plug to the targeted zone;
(e) blocking flow of subsequently pumped fluid into the targeted zone with the barrier plug while the downhole temperature in the well is at least 125° C.; and
(f) diverting flow of the subsequently second fluid to one or more second zones within the formation, permeability of the one or more second zones being less than the permeability of the targeted zone.

Embodiment 3. A method of enhancing productivity of a producing well comprising:
(a) pumping an aqueous fluid into the well, the fluid comprising:
  (i) nanoparticles;
  (ii) a polyacrylamide having a weight average molecular weight from about 1.5 million to 22 million Dalton; and
  (iii) an encapsulated liquid crosslinking agent
(b) releasing the encapsulated crosslinking agent and forming a viscous fluid from interaction of the nanoparticles, polyacrylamide and crosslinking agent when the downhole temperature in the well is at least 85° C.;
(d) transporting the viscous fluid to a targeted zone within the well and forming a barrier plug to the targeted zone;
(e) blocking flow of subsequently pumped fluid into the targeted zone with the barrier plug while the downhole temperature in the well is at least 125° C.; and
(f) diverting flow of the subsequently second fluid to one or more second zones within the formation, permeability of the one or more second zones being less than the permeability of the targeted zone.

Embodiment 4. The method of Embodiment 2, wherein the viscous fluid is formed in the well at a downhole temperature greater than or equal to 90° C.

Embodiment 5. The method of Embodiment 2 or 3, wherein flow of fluid into the targeted zone is blocked by the barrier plug over a period of about 2 hours up to about 2 weeks.

Embodiment 6. The method of Embodiment 2 or 3, wherein flow of fluid into the targeted zone is blocked by the barrier plug over a period of at least 72 hours.

Embodiment 7. The method of Embodiment 2 or 3, wherein flow of fluid into the targeted zone is blocked by the barrier plug over a period of about 8 hours to about 48 hours.

Embodiment 8. The method of any of Embodiments 1 to 7, wherein the well or reservoir is a geothermal well.

Embodiment 9. The method of any of Embodiments 1 to 7, wherein the well or reservoir is a gas or oil well.

Embodiment 10. A method of stimulating a subterranean formation penetrated by a geothermal well, the method comprising:
(a) introducing into the well a first aqueous fluid comprising:
  (i) nanoparticles;
  (ii) a polyacrylamide having a weight average molecular weight from about 1.5 million to 22 million Dalton; and
  (iii) an encapsulated liquid crosslinking agent
(b) gelling the aqueous fluid and forming a plug in a targeted zone within the formation wherein the plug constitutes a fluid impermeable barrier over a period of one hour to two weeks at a downhole temperature of 125° C. or higher;
(c) pumping one or more second fluids into the geothermal well; and
(d) diverting flow of the one or more second fluids from the targeted zone to one or more second zones, wherein permeability of the targeted zone is higher than the permeability of the one or more second zones.

Embodiment 11. A method of enhancing productivity of a hydrocarbon-bearing formation penetrated by a well having multiple productive zones comprising:
(a) introducing to a pre-determined productive zone of the well an aqueous treatment fluid comprising:
  (i) nanoparticles;
  (ii) a polyacrylamide having a weight average molecular weight from about 1.5 million to 22 million Dalton;

(iii) an encapsulated liquid crosslinking agent; and
forming a viscous gel at a temperature within the well of at least 85° C.;
(b) isolating the pre-determined productive zone from other productive zones in the well by hardening the viscous gel;
(c) perforating the isolated pre-determined productive zone; and
(d) stimulating the perforated pre-determined productive zone by introducing into the perforated pre-determined productive zone a stimulation fluid at a pressure sufficient to fracture the perforated pre-determined productive zone wherein the temperature in the well is at least 125° C. and stimulation of the perforated isolated pre-determined productive zone is over a period of one hour to two weeks.

Embodiment 12. A method of enhancing productivity of a subterranean formation having multiple productive zones comprising:
(a) after perforating and fracturing a targeted zone within the formation, introducing an aqueous fluid to the targeted zone, wherein the aqueous fluid comprises (i) nanoparticles; (ii) a polyacrylamide having a weight average molecular weight from about 1.5 million to 22 million Dalton; and (iii) an encapsulated liquid crosslinking agent;
(b) isolating a non-stimulated zone of the well from the targeted zone by gelling the fluid and creating a temporary plug to the fractured targeted zone.

Embodiment 13. The method of any of Embodiments 1 to 12, wherein the polyacrylamide is of the structural formula:

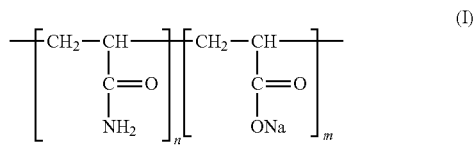

wherein the molar ratio of m:n is from about 5:95 to about 95:5.

Embodiment 14. The method of any of Embodiments 1 to 13, wherein the polyacrylamide is a powder.

Embodiment 15. The method of any of Embodiments 1 to 13, wherein the polyacrylamide is in an emulsion or oil slurry.

Embodiment 16. The method of any of Embodiments 1 to 13, wherein the polyacrylamide comprises microbeads having a diameter between from about 0.5 to 2.0 microns.

Embodiment 17. The method of any of Embodiments 1 to 16, wherein the weight average molecular weight of the polyacrylamide is from about 5 to about 20 million Dalton.

Embodiment 18. The method of Embodiment 17, wherein the weight average molecular weight of the polyacrylamide is from about 6 million to about 8 million Dalton.

Embodiment 19. The method of any of Embodiments 1 to 18, wherein the degree of hydrolysis of the acrylamide units of the polyacrylamide polymer is from about 0.15 to about 0.40.

Embodiment 20. The method of Embodiment 19, wherein the degree of hydrolysis of the acrylamide units of the polyacrylamide polymer is from about 0.25 to about 0.35.

Embodiment 21. The method of any of Embodiments 1 to 20, wherein the liquid crosslinking agent is a metal or a metal complex and wherein the metal is chromium, titanium, aluminum, zirconium, calcium, magnesium or zinc.

Embodiment 22. The method of Embodiment 21, wherein the metal of the crosslinking agent is or contains chromium.

Embodiment 23. The method of Embodiment 22, wherein the crosslinking agent is chromium acetate or chromium chloride.

Embodiment 24. The method of any of Embodiments 1 to 23, wherein the crosslinking agent has a counterion or ligand selected from the group consisting of acetate, proprionate, lactate, oxalate, malonate, maleate, succinate, glutamate, phosphonate, sulfonate, carbonate or halide.

Embodiment 25. The method of any of Embodiments 1 to 24, wherein the aqueous fluid prior to being gelled comprises between from about 2,000 to about 20,000 ppm of the polyacrylamide.

Embodiment 26. The method of Embodiment 25, wherein the aqueous fluid prior to being gelled comprises between from about 12,000 to about 15,000 ppm of the polyacrylamide.

Embodiment 27. The method of any of Embodiments 1 to 26, wherein the nanoparticles have a number average particle less than 1000 nm in diameter.

Embodiment 28. The method of any of Embodiments 1 to 27, wherein the nanoparticles are selected from the group consisting of silica, alumina, titania, silicic acid, aluminum oxides, aluminum hydroxides, zirconium oxides, zirconium hydroxides, zirconium hydroxyoxides, tungsten oxide, iron oxide, tungsten carbide, silicon carbide, boron carbide, titanium nitride, boron nitride, silicon nitride, fullerenes, nanographites, carbon nanotubes, antimony oxide, vanadium oxide, magnesium oxide, clays and nonoclays.

Embodiment 29. The method of any of Embodiments 1 to 27, wherein the nanoparticles are selected from the group consisting of alkali metals, alkaline earth metals, a lanthanide, an actinide or a transition metal, fullerenes, nanotubes, graphenes, nanodots, nanorods, nanodiamonds, polysilsesquioxanes, nanoclays and combinations thereof.

Embodiment 30. The method of any of Embodiments 1 to 29, wherein the nanoparticles are derivatized with a functional group selected from the group consisting of carboxy, epoxy, ether, ketone, amine, hydroxy, alkoxy, alkyl, aryl, aralkyl, alkaryl and lactone or a combination thereof.

Embodiment 31. The method of any of Embodiments 1 to 29, wherein the nanoparticles are derivatized with a functional group selected from (i) organosilicon materials, (ii) fluorinated organic acids or a reactive derivative; (iii) linear or branched alkyl organic acids or a reactive derivative, (iv) substituted alkyl organic acids or a reactive derivative, (v) aryl or substituted aryl organic acids or a reactive derivative as well as (vi) mixtures thereof.

What is claimed is:
1. A method of stimulating a subterranean formation penetrated by a geothermal well, the method comprising:
(a) introducing into the well a first aqueous fluid comprising:
(i) nanoparticles;
(ii) a polyacrylamide having a weight average molecular weight from about 1.5 million to 22 million Dalton; and
(iii) an encapsulated liquid crosslinking agent
(b) gelling the aqueous fluid and forming a plug in a targeted zone within the formation wherein the plug constitutes a fluid impermeable barrier over a period of one hour to two weeks at a downhole temperature of 125° C. to 350° C.;
(c) pumping one or more second fluids into the geothermal well; and

(d) diverting flow of the one or more second fluids from the targeted zone to one or more second zones, wherein a permeability of the targeted zone is higher than a permeability of the one or more second zones.

2. The method of claim 1, wherein the polyacrylamide is of the structural formula:

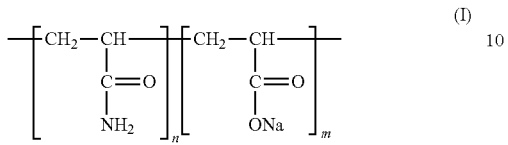

wherein the molar ratio of m:n is from about 5:95 to about 95:5.

3. The method of claim 2, wherein the polyacrylamide is a powder, in an emulsion or oil slurry, or microbeads having a diameter between from about 0.5 to 2.0 microns.

4. The method of claim 1, wherein the weight average molecular weight of the polyacrylamide is from about 5 to about 20 million Dalton and/or the degree of hydrolysis of the acrylamide units of the polyacrylamide polymer is from about 0.15 to about 0.40.

5. The method of claim 1, wherein the liquid crosslinking agent is a metal or a metal complex and wherein the metal is chromium, titanium, aluminum, zirconium, calcium, magnesium or zinc.

6. The method of claim 5, wherein the crosslinking agent is chromium acetate or chromium chloride.

7. The method of claim 1, wherein aqueous fluid prior to being gelled comprises between from about 2,000 to about 20,000 ppm of the polyacrylamide.

8. The method of claim 1, wherein the nanoparticles have a number average particle size of less than 1000 nm in diameter.

9. The method of claim 1, wherein the nanoparticles are selected from the group consisting of silica, alumina, titania, silicic acid, aluminum oxides, aluminum hydroxides, zirconium oxides, zirconium hydroxides, zirconium hydroxyoxides, tungsten oxide, iron oxide, tungsten carbide, silicon carbide, boron carbide, titanium nitride, boron nitride, silicon nitride, fullerenes, nanographites, carbon nanotubes, antimony oxide, vanadium oxide, magnesium oxide, clays, nonoclays, alkali metals, alkaline earth metals, a lanthanide, an actinide, a transition metal, fullerenes, graphenes, nanodots, nanorods, nanodiamonds, polysilsesquioxanes, nanoclays and combinations thereof.

10. The method of claim 1, wherein the nanoparticles are derivatized with a functional group selected from the group consisting of carboxy, epoxy, ether, ketone, amine, hydroxy, alkoxy, alkyl, aryl, aralkyl, alkaryl, lactone, organosilicon materials, fluorinated organic acids or a reactive derivative; linear or branched alkyl organic acids or a reactive derivative, substituted alkyl organic acids or a reactive derivative, aryl or substituted aryl organic acids or a reactive derivative and mixtures thereof.

11. A method of enhancing productivity of a hydrocarbon-bearing formation penetrated by a well having multiple productive zones comprising:
(a) introducing to a pre-determined productive zone of the well an aqueous treatment fluid comprising:
(i) nanoparticles;
(ii) a polyacrylamide having a weight average molecular weight from about 1.5 million to 22 million Dalton;
(iii) an encapsulated liquid crosslinking agent; and
forming a viscous gel at a temperature within the well of at least 85° C. and up to 350° C.;
(b) isolating the pre-determined productive zone from other productive zones in the well by hardening the viscous gel;
(c) perforating the isolated pre-determined productive zone; and
(d) stimulating the perforated pre-determined productive zone by introducing into the perforated pre-determined productive zone a stimulation fluid at a pressure sufficient to fracture the perforated pre-determined productive zone.

12. The method of claim 11, wherein the polyacrylamide is of the structural formula:

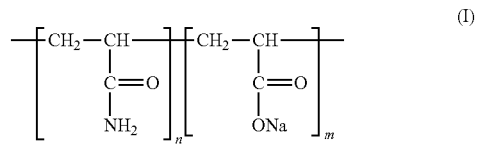

wherein the molar ratio of m:n is from about 5:95 to about 95:5.

13. The method of claim 12, wherein the polyacrylamide is a powder, in an emulsion or oil slurry, or microbeads having a diameter between from about 0.5 to 2.0 microns.

14. A method of enhancing productivity of fluids from a subterranean formation penetrated by a well comprising pumping into the well an aqueous fluid comprising:
(i) nanoparticles;
(ii) a polyacrylamide having a weight average molecular weight from about 1.5 million to 22 million Dalton; and
(iii) an encapsulated liquid crosslinking agent
wherein at least one of the following is true:
(a) the subterranean formation is subjected to a stimulation operation;
(b) a crosslinked gel is formed from the polyacrylamide and crosslinking agent wherein the nanoparticles are dispersed in the crosslinked gel;
(c) the nanoparticles are charged nanoparticles: or
(d) the nanoparticles are selected from the group consisting of silica, alumina, titania, silicic acid, aluminum oxides, aluminum hydroxides, aluminum hydroxyoxides, aluminosilicates, zirconium oxides, zirconium hydroxides, zirconium hydroxyoxides, tungsten oxide, iron oxide, tungsten carbide, silicon carbide, boron carbide, titanium nitride, boron nitride, silicon nitride, fullerenes, nanographites, carbon nanotubes, antimony oxide, vanadium oxide, magnesium oxide, clays, nonoclays, alkali metals, alkaline earth metals, a lanthanide, an actinide, a transition metal, fullerenes, graphenes, nanodots, nanorods, nanodiamonds, polysilsesquioxanes, nanoclays and combinations thereof.

15. The method of claim 14, further comprising:
(a) releasing the encapsulated crosslinking agent and forming a viscous fluid from interaction of the nanoparticles, polyacrylamide and crosslinking agent when a downhole temperature in the well is at least 85° C.;
(b) transporting the viscous fluid to a targeted zone within the well and forming a barrier plug to the targeted zone;
(c) blocking flow of subsequently pumped fluid into the targeted zone with the barrier plug while the downhole temperature in the well is at least 125° C. and as high as 350° C.; and (d) diverting flow of the subsequently pumped fluid to one or more second zones within the formation, a permeability of the one or more second zones being less than a permeability of the targeted zone.

16. The method of claim 15, wherein the well is a geothermal well.

17. The method of claim 15, wherein the polyacrylamide is of the structural formula:

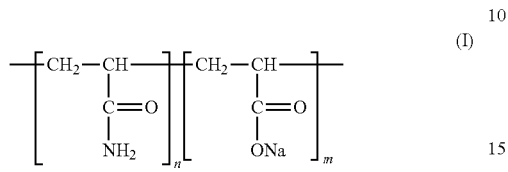

wherein the molar ratio of m:n is from about 5:95 to about 95:5.

18. The method of claim 17, wherein the polyacrylamide is a powder, in an emulsion or oil slurry, or microbeads having a diameter between from about 0.5 to 2.0 microns.

19. The method of claim 15, wherein the crosslinking agent is chromium acetate or chromium chloride and/or the nanoparticles have a number average particle size less than 1,000 nm in diameter.

20. The method of claim 14, wherein the subterranean formation is subjected to a stimulation operation.

21. The method of claim 14, wherein a crosslinked gel is formed from the polyacrylamide and crosslinking agent and further wherein the nanoparticles are dispersed in the crosslinked gel.

\* \* \* \* \*